(12) United States Patent
Shikakura et al.

(10) Patent No.: US 6,219,157 B1
(45) Date of Patent: *Apr. 17, 2001

(54) IMAGE CODING APPARATUS

(75) Inventors: Akihiro Shikakura, Kawasaki; Makoto Gohda, Tokyo; Yoshiki Ishii, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,435

(22) Filed: Aug. 22, 1997

Related U.S. Application Data

(63) Continuation-in-part of application No. 08/402,567, filed on Mar. 13, 1995, now abandoned, which is a continuation of application No. 08/077,116, filed on Jun. 16, 1993, now abandoned.

(30) Foreign Application Priority Data

Jun. 18, 1992 (JP) .................................................. 4-159762
Jun. 18, 1992 (JP) .................................................. 4-159768
Dec. 22, 1992 (JP) .................................................. 4-342187

(51) Int. Cl.$^7$ ............................ H04N 7/01; H04N 1/415; H04N 7/12

(52) U.S. Cl. ...................... 358/433; 358/539; 358/467; 348/439

(58) Field of Search .................................. 358/433, 426, 358/261.1, 261.3, 428, 432, 453, 467, 468, 539, 538, 525; 348/384, 397, 403, 439; 382/232, 428

(56) References Cited

U.S. PATENT DOCUMENTS

| | | | |
|---|---|---|---|
| 4,717,962 | * 1/1988 | Moore | 358/433 |
| 4,953,019 | 8/1990 | Skikakura et al. | 358/133 |
| 4,963,992 | * 10/1990 | Doi et al. | 348/424 |
| 4,975,915 | * 12/1990 | Sako et al. | 371/37.4 |
| 4,979,187 | 12/1990 | Aoki et al. | 375/27 |
| 5,067,010 | * 11/1991 | Ishii et al. | 358/13 |
| 5,136,379 | * 8/1992 | Ishii | 358/138 |
| 5,168,375 | * 12/1992 | Reisch et al. | 358/432 |
| 5,170,264 | * 12/1992 | Saito et al. | 358/433 |
| 5,177,797 | * 1/1993 | Takenaka | 358/433 |
| 5,416,615 | * 5/1995 | Shirota | 358/433 |
| 5,588,072 | * 12/1996 | Wang | 382/176 |
| 5,737,450 | * 4/1998 | Hajjahmad et al. | 382/260 |
| 5,809,209 | * 9/1998 | Hoshi et al. | 386/124 |

FOREIGN PATENT DOCUMENTS

| | | | |
|---|---|---|---|
| 1228382A | 9/1989 | (JP) | H04N/5/92 |
| 0662226 | * 3/1994 | (JP) . | |

* cited by examiner

Primary Examiner—Anh-Vinh Nguyen
(74) Attorney, Agent, or Firm—Fitzpatrick, Cella, Harper & Scinto

(57) ABSTRACT

An image coding apparatus comprises a divider for dividing an image into a plurality of coding blocks overlapped to each other, and a coder for coding them for each of the coding blocks divided by the divider.

25 Claims, 11 Drawing Sheets

△A

△B  x E  △D    $E = \dfrac{A + B + C + D}{4}$

△C $$D = \frac{A + B + 2C}{4}$$

IMAGE CODING APPARATUS

This application is a continuation, of application Ser. No. 08/402,567 filed Mar. 13, 1995, now abandoned which is a continuation of Ser. No. 08/077,116, filed Jun. 16, 1993, now abandoned.

BACKGROUND OF THE INVENTION

1. Field of the Invention

The present invention relates to an image coding apparatus, and more particularly to an image coding apparatus which divides an image into blocks and codes it for each block.

2. Related Background Art

As one of coding methods for highly compressing an image signal while suppressing the deterioration of the image signal (high efficiency coding), a block coding method which divides an image into a plurality of blocks and codes it for each block has been known.

A representative method for coding an image signal in a block is a DCT (Discrete Cosine Transform) coding method.

In the DCT coding method, pixel data in a coding block are converted to DCT coefficient data representing a spatial frequency distribution by the DCT conversion and the DCT conversion coefficients are compressed in accordance with the fineness of the image and a visual characteristic.

The above high efficiency coding method enables the transmission at a low transmission rate but it includes a large affect by a transmission error.

Accordingly, it is necessary to countermeasure against the code error such as an error detection and correction code.

Particularly when the coded data is to be transmitted through an electromagnetic transformation system such as a magnetic recording or a BS communication system, the deterioration of the transmission quality is anticipated and hence the countermeasure for the code error is essential.

FIG. 1 shows a block diagram of an image transmission system by the high efficiency coding. An image signal to be transmitted is applied to an input terminal 10. An A/D converter 12 digitizes an analog signal from the input terminal 10 and a block forming circuit 14 divides the image data from the A/D converter 12 to coding blocks of 8×8 pixels or 4×4 pixels and outputs them in the order of coding blocks. In FIG. 2, one frame of image is divided into blocks of 4×4 pixels.

A high efficiency coding circuit 16 highly efficiently codes the image data of the coding blocks from the block forming circuit 14 for each coding block. Thus, the information quantity is compressed. An error correction coding circuit 18 codes with an error correction function the image data compressed by the high efficiency coding circuit 16. Namely, it calculates an error detection and correction parity and adds it to the compressed image data. The compressed image data which has been error correction coded by the error correction coding circuit 18 is outputted to a transmission line 20.

The transmission line 20 may be a wired or wireless communication medium such as an optical fiber, a BS or a microwave, or a recording and reproducing system such as a magnetic tape, a magnetic disk, an optical disk or a semiconductor memory (for example, a digital video tape recorder (VTR) or a digital audio tape recorder (DAT)). The transmission rate may be several tens K bits/sec to several tens M bits/sec although it depends on the information quantity of the original image, the compression rate and the transmission time.

In a receiving station, the data transmitted through the transmission line 20 is temporarily stored in a memory 22, and an error correction circuit 24 corrects an error in the transmitted data by the error correction parity of the transmission. The data stored in the memory 22 and having the error corrected is supplied to a high efficiency decoding circuit 26, which expands the compressed image data.

For an encoding block including a transmission error which has not been corrected by the error correction circuit 24, an interpolation circuit 28 interpolates by replacing it with the data of the encoding block at the same position in the previous frame (or field). The D/A converter 30 converts the output of the interpolation circuit 28 to an analog signal which is supplied to an output terminal 32.

In the image transmission system shown in FIG. 1, it frequently happens that the transmission error created in the transmission line 20 exceeds an error correction ability of the error correction code by the error correction coding circuit 18. As a result, the interpolation ability of the interpolation circuit 28 significantly affects to the quality of the reproduced image.

In a prior art system, the unit of processing of the interpolation circuit 28 is equal to the encoding block.

Namely, in the prior art interpolation method, the coding block having an incorrectable error is interpolated by using the coding block at the same image position in the immediately previous frame.

Accordingly, when the coding block is considerably large, the unit of processing of the interpolation is large and the effect of interpolation is reduced.

Further, since the interpolating block is spaced in time and space, it may be visually recognized.

SUMMARY OF THE INVENTION

It is an object of the present invention to provide an image coding apparatus for reducing the deterioration of an image quality by an interpolation process done in decoding image coded data.

In order to achieve the above object, in one preferred embodiment of the present invention, the image coding apparatus comprises division means for dividing an image into a plurality of encoding blocks overlapped to each other, and coding means for coding the encoding blocks divided by the division means, for each block.

Other objects and advantages of the present invention will become apparent from the following detailed description taken in conjunction with the appended claims.

DETAILED DESCRIPTION OF THE PREFERRED EMBODIMENTS

An embodiment of the image coding apparatus of the present invention is now explained with reference to the drawings. In the present embodiment, a digital VTR is used as the image coding apparatus.

Figure 3:
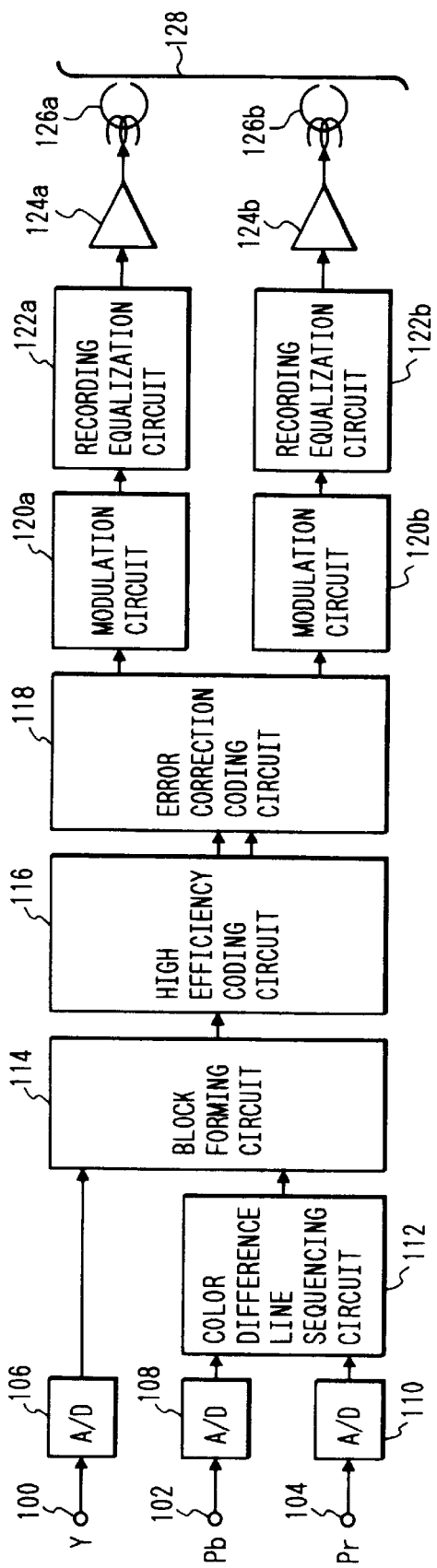
FIG. 3 shows a block diagram of a recording unit of a digital VTR in one embodiment of the present invention.

FIG. 3 shows a block diagram of a recording unit of the digital VTR of the present embodiment. The present embodiment relates to a digital VTR which compression-codes a hi-vision signal to record and reproduce it on and from a magnetic tape.

In FIG. 3, an analog luminance signal Y, an analog color difference signal Pb and an analog color difference signal Pr are applied to input terminals 100, 102 and 104, respectively. A band width of the analog signal applied to the input terminal 100 is approximately 20 MHz, and band widths of the analog signals Pb and Pr applied to the input terminals 102 and 104 are approximately 10 MHz.

The analog luminance signal applied to the input terminal 100 is converted to a digital signal by an A/D converter 106, and the analog color difference signals Pb and Pr applied to the input terminals 102 and 104 are converted to digital signals by A/D converters 108 and 110, respectively. A sampling rate for the color difference signals Pb and Pr is ½ of that of the luminance signal Y. A color difference line sequencing circuit 112 line-sequences the outputs of the A/D converters 108 and 110.

Figure 1:
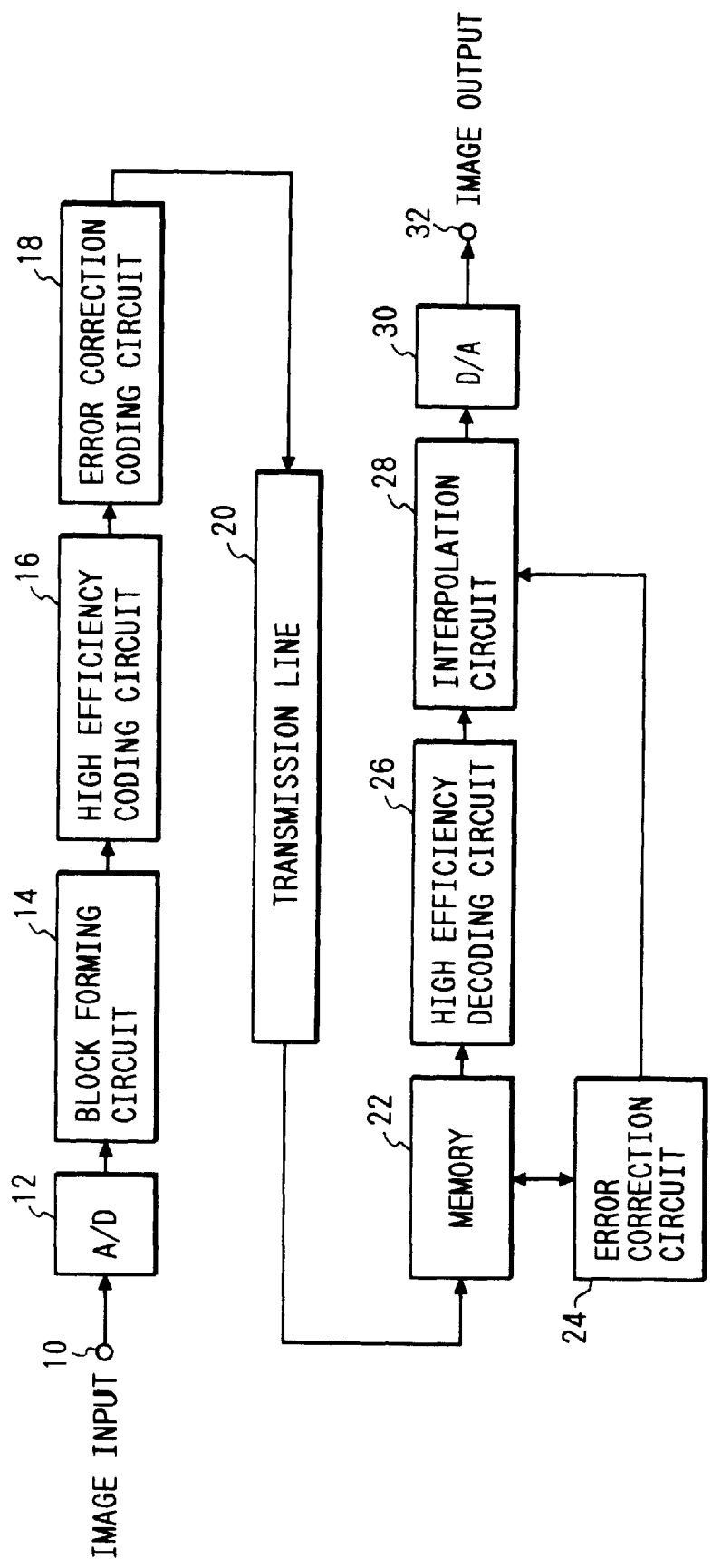
FIG. 1 shows a block diagram of a conventional image transmission system.
Figure 2:
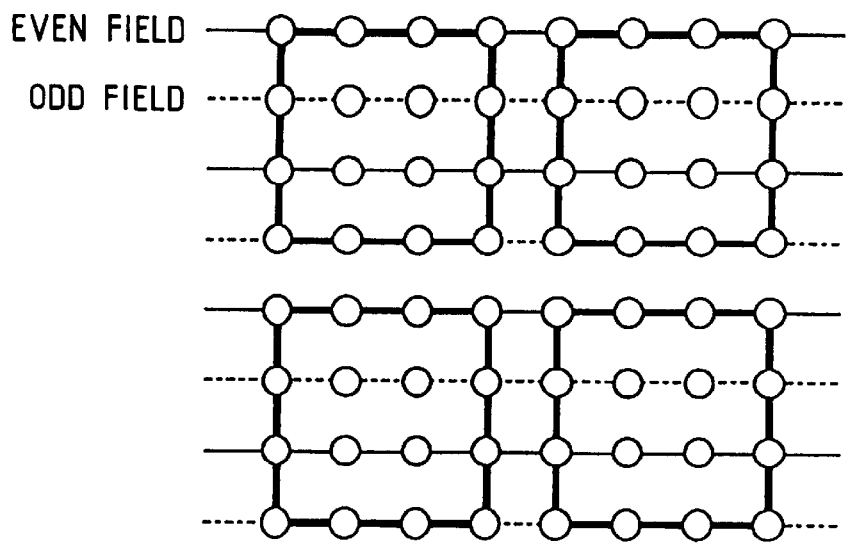
FIG. 2 shows a configuration of a prior art encoding block.
Figure 4:
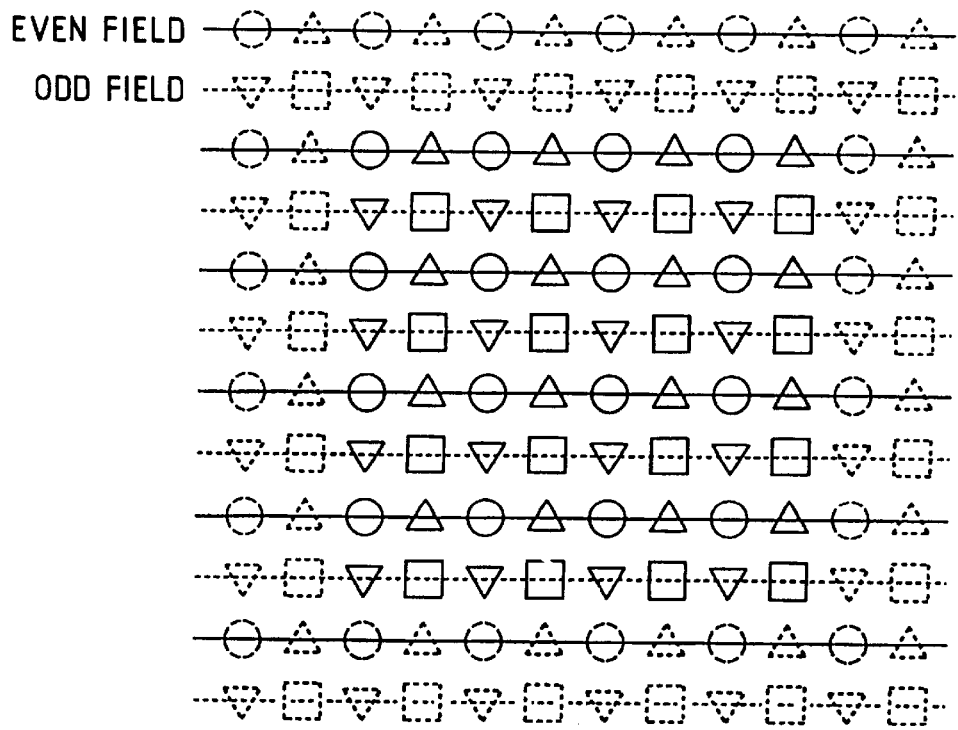
FIG. 4 shows a configuration of a coding block in the embodiment.

A block forming circuit 114 divides the digital luminance signal from the A/D converter 106 and the line sequencing color difference signal from the color difference sequencing circuit 112 into encoding blocks. A configuration of the coding block in the block forming circuit 114 is shown in FIG. 4. In the present embodiment, all pixels in one frame are divided into four groups of blocks (or planes). Namely, all pixels in even fields are assigned to a first group of coding blocks or planes (pixels marked with ○) and a second group of coding blocks or planes (pixels marked with Δ) every other pixel, and all pixels in odd field screens are assigned to a third group of coding blocks or planes (pixels marked with ▽) and a fourth group of coding blocks or planes (pixels marked with □) every other pixels. Adjacent 4 pixels×4 pixels in one group of coding blocks are treated as one coding block.

In this manner, four coding blocks are in an overlapped position to each other in 8 pixels×8 pixels. In the prior art system, the coding blocks are arranged in a non-overlap manner.

Figure 5:
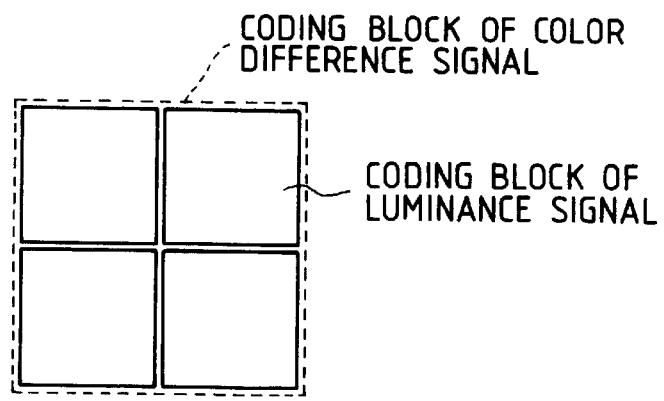
FIG. 5 shows a comparison of coding blocks of a luminance signal and a color difference signal.

The color difference signals Pb and Pr are sampled at one half sampling frequency of that of the luminance signal Y and are line-sequenced. Accordingly, a ratio of sizes of the coding blocks of the color difference signals and the luminance signal is 4/1 as shown in FIG. 5.

The image data divided into blocks by the block forming circuit 114 is supplied to the high efficiency encoding circuit 116 where it is high efficiency-coded for each coding block. As a result, the information quantity (band width) is compressed to ⅒. The error correction coding circuit 118 adds an error correction parity to the output of the high efficiency coding circuit 116 and supplies it to modulation circuits 120a and 120b in two phases, because a bit rate after the error correction coding is approximately 60 M bps while the band width of the magnetic recording system is approximately 30 M bps.

The error correction coding circuit 118 supplies the error correction coding data of the first group of coding blocks (pixels marked with ○ in FIG. 4) to the modulation circuit 120a, and supplied the error correction coding data of the second group of coding blocks (pixels marked with Δ in FIG. 4) to the modulation circuit 120b, and in the next half revolution of the rotating drum, it supplies the error correction coding data of the third group of encoding blocks (pixels marked with ▽ in FIG. 4) to the modulation circuit 120a and supplies the error correction encoding data of the fourth group of coding blocks (pixels marked with □ in FIG. 4) to the modulation circuit 120b.

The error correction coding circuit 118 includes a formatting circuit for recording on a magnetic tape 128, which formats quantization step information and coded data from the high efficiency coding circuit 116.

The modulation outputs of the modulation circuits 120a and 120b are supplied to magnetic heads 126a and 126b through recording equalization circuits 122a and 122b and recording amplifiers 124a and 124b, and recorded on the magnetic tape 128. The magnetic heads 126a and 126b have different azimuth angles from each other.

Figure 6:
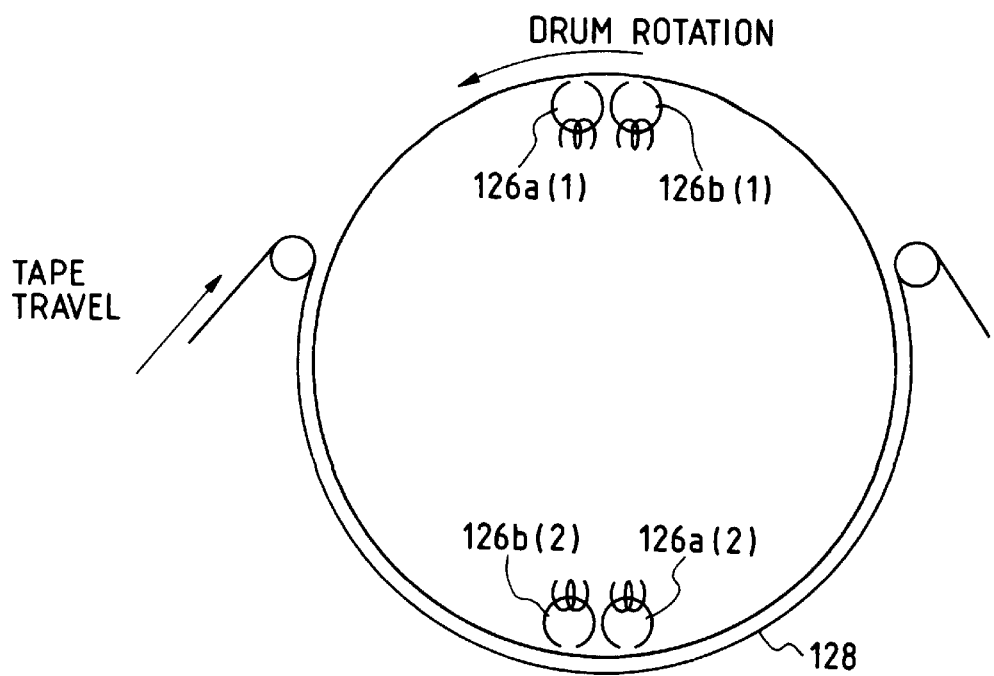
FIG. 6 shows a plan view of a head in the embodiment.

As shown in FIG. 6, two pairs of magnetic heads 126a and 126b are provided on the rotating drum at 180 degrees separation. One pair of magnetic heads are designated by 126a(1) and 126b(1), and the other pair of magnetic heads are designated by 126a(2) and 126b(2). The magnetic heads 126a(1) and 126b(1) and the magnetic heads 126a(2) and 126b(2) are alternately used. The magnetic heads 126a(1) and 126a(2) record the output of the recording amplifier 124a on the magnetic tape 128, and the magnetic heads 126b(1) and 126b(2) record the output of the recording amplifier 124b on the magnetic tape 128.

Figure 7:
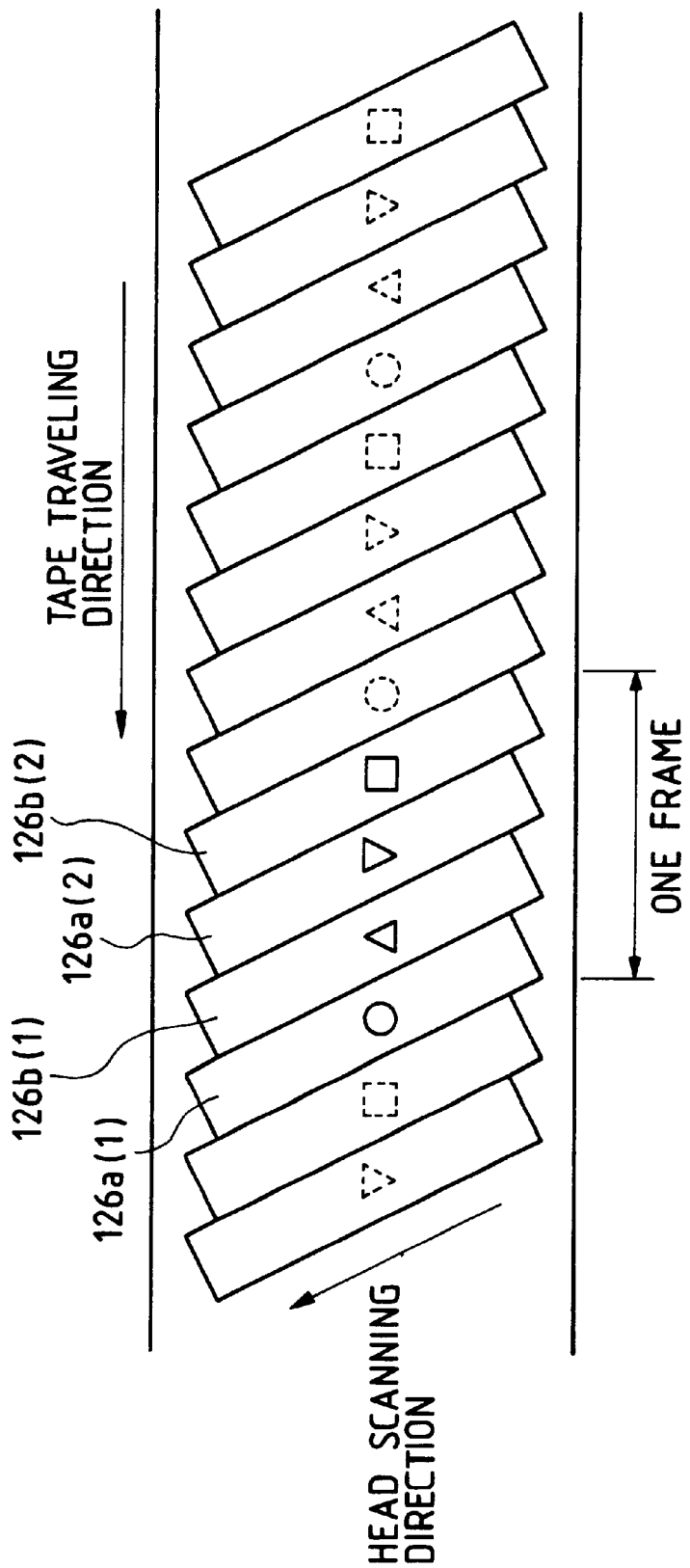
FIG. 7 shows a track pattern in the embodiment.

More specifically, the magnetic head 126a(1) records the modulation data of the first group of coding blocks (pixels marked with ○ in FIG. 4) on the magnetic tape 128, the magnetic head 126b(1) records the modulation data of the second group of encoding blocks (pixels marked with Δ in FIG. 4) on the magnetic tape 128, the magnetic head 126a(2) records the modulation data of the third group of coding blocks (pixels marked with ▽ in FIG. 4), and the magnetic head 126b(2) records the modulation data of the fourth group of coding blocks (pixels marked with □ in FIG. 4). A track pattern of the magnetic tape 128 is shown in FIG. 7.

Figure 8:
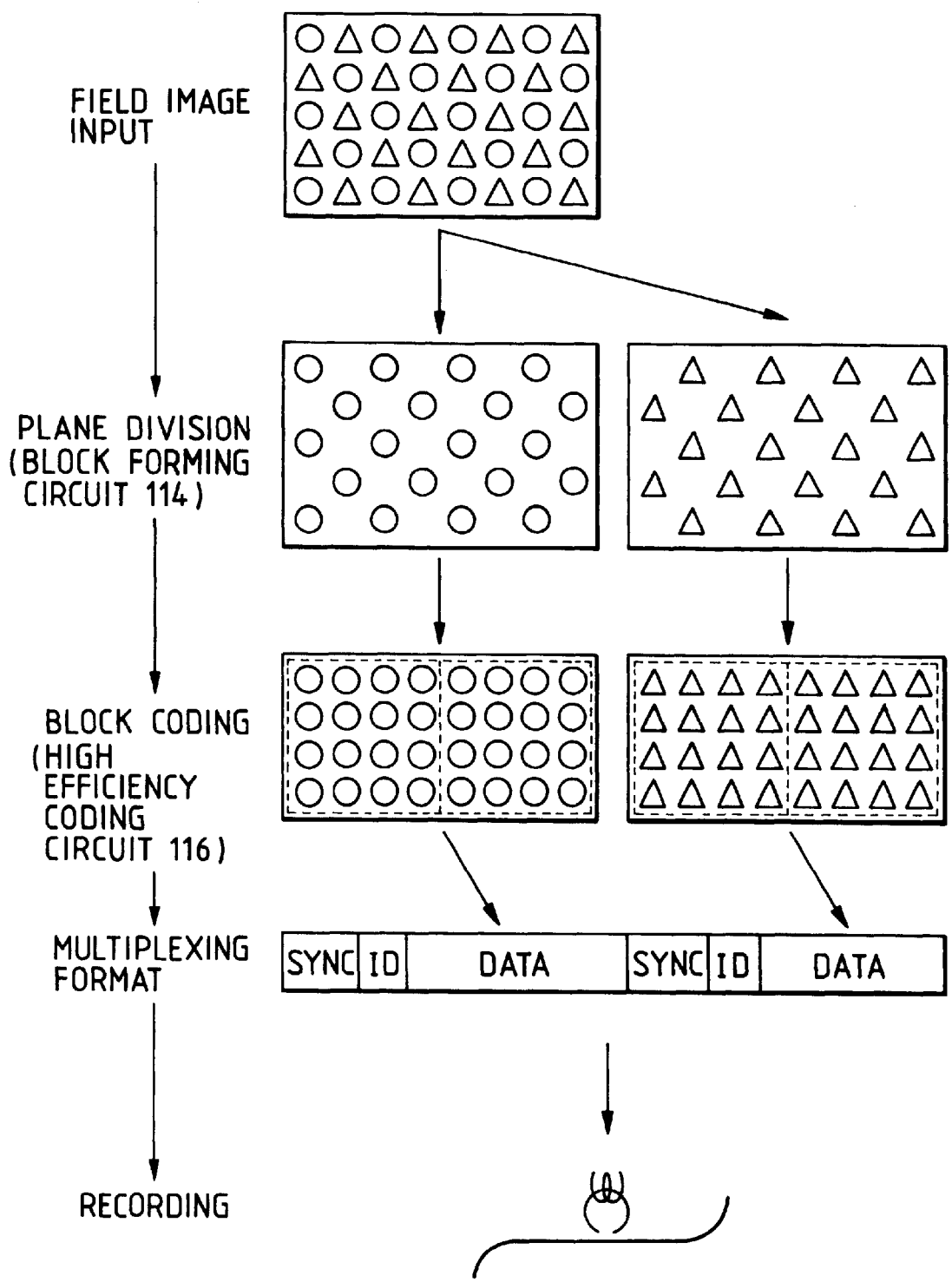
FIG. 8 shows a flow of a coding process in the embodiment.

FIG. 8 shows a flow of the process described above in the present embodiment. An input field image is divided into two groups of blocks (planes). A predetermined number of (for example, 4×4) adjacent pixels in each plane form a coding block. A synchronous code SYNC and ID are added to the coding data to form a synchronization frame, and the synchronization frames of the respective planes are multiplexed and recorded (transmitted) on the recording medium (transmission medium).

Figure 9:
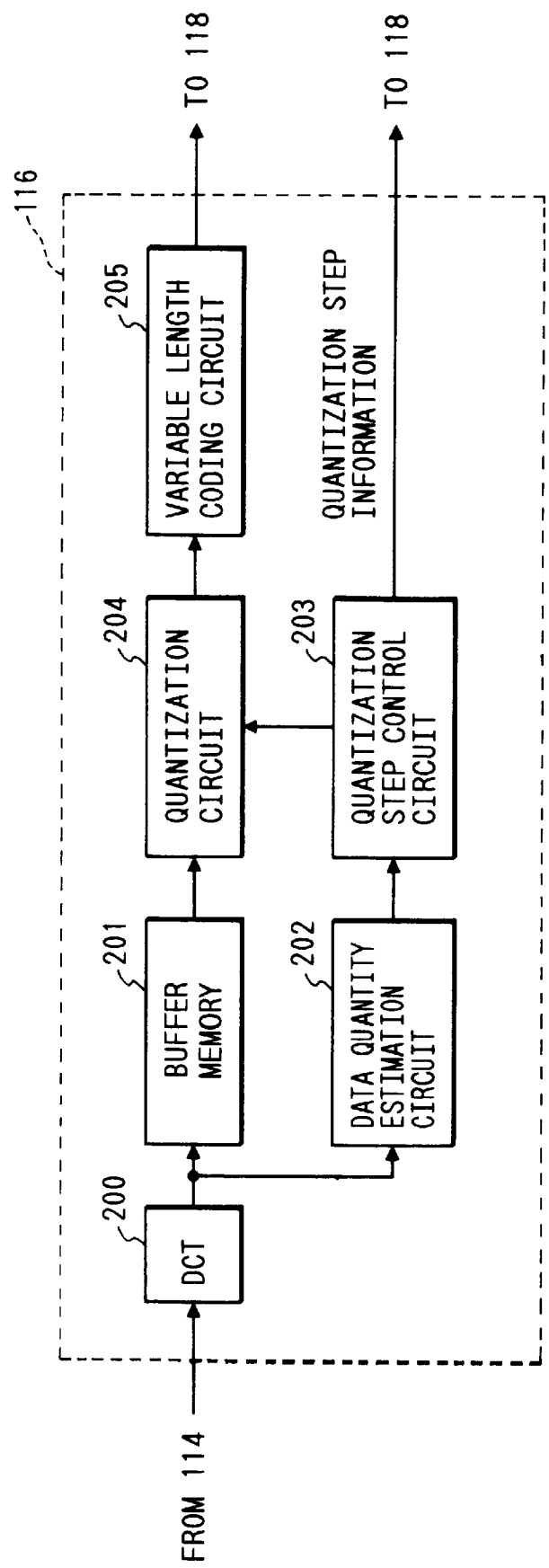
FIG. 9 shows a block diagram of a high efficiency coding circuit 116 in FIG. 4.

FIG. 9 shows a block diagram of the high efficiency coding circuit 116 of FIG. 4.

In FIG. 9, numeral 200 denotes a DCT conversion circuit, numeral 201 denotes a buffer, numeral 202 denotes a data quantity estimation circuit, numeral 203 denotes a quantization step control circuit, numeral 204 denotes a quantization circuit and numeral 205 denotes a variable length coding circuit.

An operation of the high efficiency coding circuit 116 of the above construction is now explained.

The block samples from the block forming circuit 114 are DCT-converted by the DCT conversion circuit 200. The DCT-converted DCT coefficients are supplied to the buffer 201 and the data quantity estimation circuit 202 a predetermined number of blocks at a time.

The data quantity estimation circuit 202 calculates the data quantity after the coding, and the quantization step control circuit 203 controls the quantization characteristic of the quantization circuit 204 in accordance with the calculation result.

The quantization step control circuit 203 also supplies the quantization step information used to control the quantization characteristic of the quantization circuit 204 to the error correction coding circuit 118.

The DCT coefficients supplied to the buffer 201 are delayed until the quantization characteristic of the quantization circuit 204 is determined.

The DCT coefficients from the buffer 201 are quantized by the quantization circuit 204 having the quantization characteristic thereof controlled by the quantization step control circuit 203.

The quantized coefficients are variable-length coded by the variable length coding circuit 205 and it is supplied to the error correction coding circuit 118.

Figure 10:
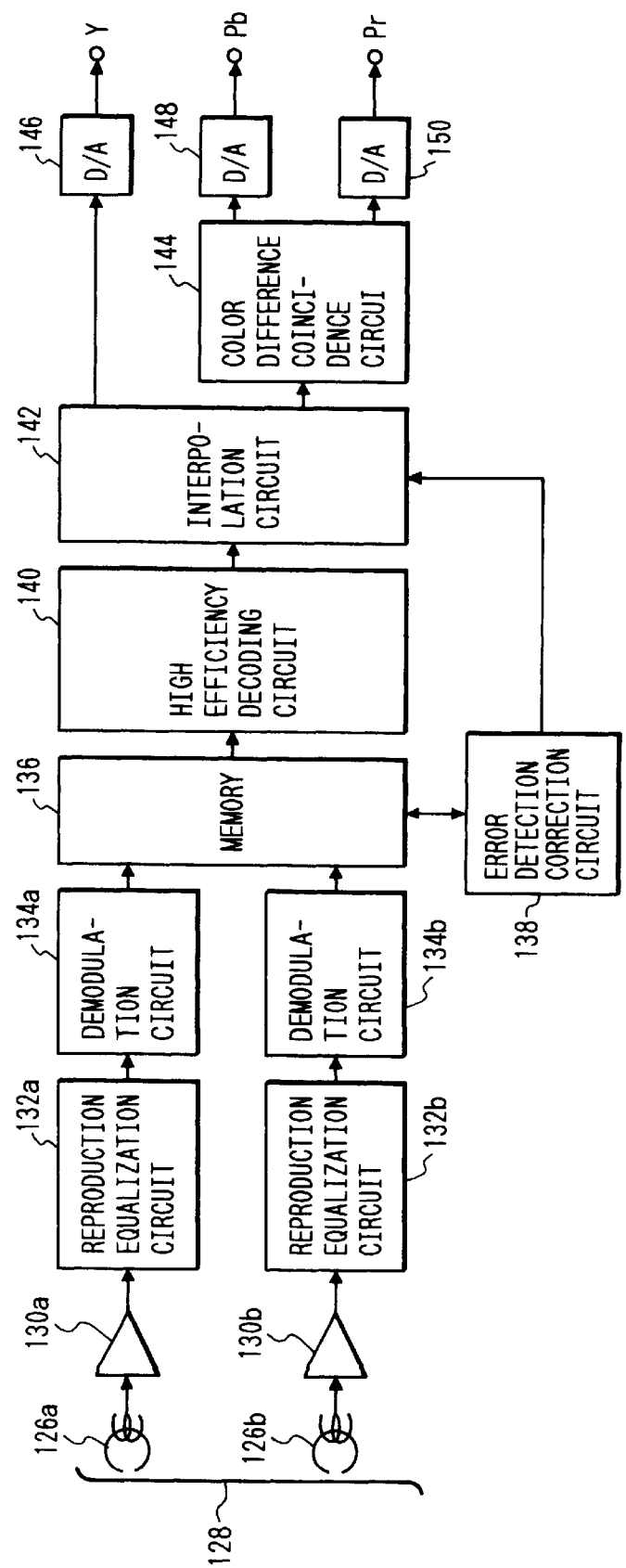
FIG. 10 shows a block diagram of a reproducing unit of a digital VTR corresponding to FIG. 3, FIGS. 11A and 11B show a method for correcting (interpolating) error data in decoding data coded and recorded data as shown in FIG. 8.

FIG. 10 shows a block diagram of a reproducing unit of a digital VTR corresponding to FIG. 3. As shown in FIG. 7, the data recorded on the magnetic tape 128 is reproduced by the magnetic heads 126a and 126b. The reproduced outputs of the magnetic heads 126a and 126b are stored in a memory 136 through the reproducing amplifiers 130a and 130b, reproduction euqlization circuits 132a and 132b, and demodulation circuits 134a and 134b. The reproducing amplifiers 130a and 130b amplify the outputs of the magnetic heads 126a and 126b to a desired level, the reproduction equalization circuits 132a and 132b equalize the waveforms of the outputs of the reproducing amplifiers 130a and 130b, and the demodulation circuits 143a and 143b demodulate the outputs of the reproduction equalization circuits 132a and 132b to restore the digital data.

The memory 136 also stores the error correction parity added by the error correction coding circuit 118, and the error correction circuit 138 corrects the recording and reproducing errors by using the error correction parity. The error-corrected image data is read from the memory 136 to the high efficiency coding circuit 140 which expands the compressed image data to restore the digital image signal. The restored image data is supplied to the interpolation circuit 142.

The error correction circuit 138 supplies an incorrectable flag for an incorrectable error to the interpolation circuit 142, which interpolates the data with the incorrectable error of the image data outputted from the high efficiency decoding circuit 140 in accordance with the incorrectable flag.

For example, it is assumed that the data of the second to fourth groups have been correctly reproduced but the data in the first group of blocks (pixels marked with ○ in FIG. 4) is incorrectable. This happens when dropout occurs in the magnetic head 126a(1), and in FIG. 4, the coding block including the pixels marked with ○ is not decoded but the coding blocks including the pixels marked with △ ▽, and □ are decoded. In this case, the pixels marked with ○ are highly precisely interpolated by a mean value of the adjacent pixels marked with △ or ▽. Instead of mere mean value, a weighted mean value may be used. Further, the pixels marked with □ may also be used to interpolate by all of the peripheral pixels.

When an incorrectable error occurs in one of the second to fourth groups of blocks, the data of other groups of blocks having no incorrectable error including the first group of blocks may be used to interpolate by the adjacent pixel data.

Figures 11A, 11B:
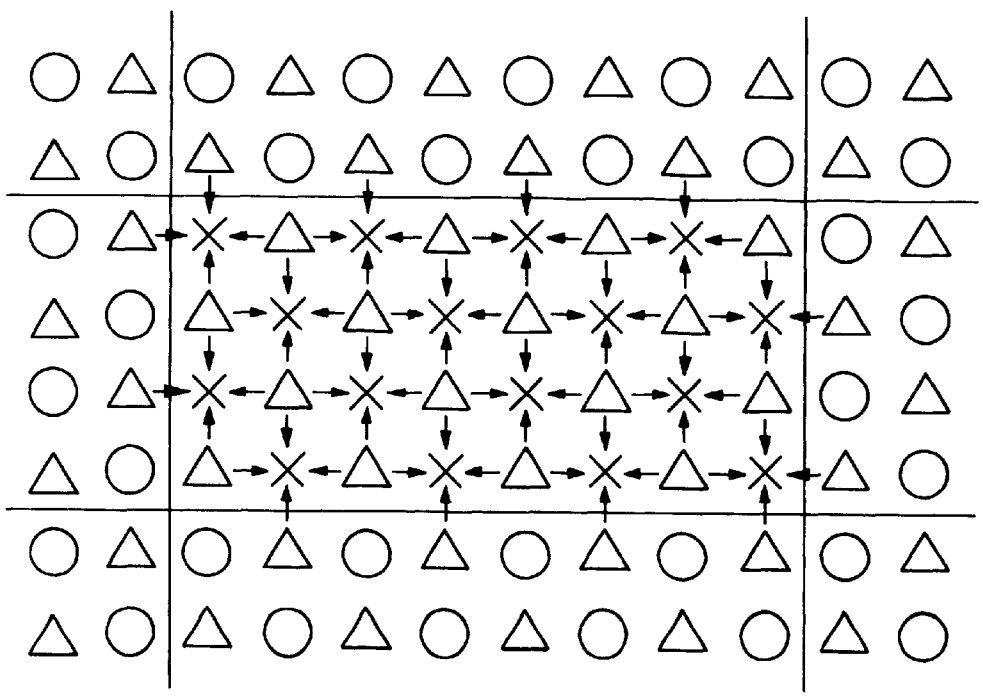

One embodiment of the interpolation method is shown in FIGS. 11A and 11B.

In FIG. 11A, it is assumed that an incorrectable error occurs in coding block of the data of the first group (pixels marked with ○) and the pixels marked with X in the coding block are incorrectable or have a large error. In the present embodiment, if the data of the second group of blocks including the pixels marked with △ in the same field and in the coding block overlapped with the incorrectable coding block is correctly reproduced, the correction (interpolation) is made based on the pixels marked with △ in the same field. For example, as shown in FIG. 11B, it is replaced by a mean value of four surrounding pixels A, B, C and D.

The interpolation circuit 142 supplies the luminance data of the interpolated image data to the D/A converter 146, and the line sequencing color difference signal to a color difference line coincidence circuit 144, which coincides the line sequencing color difference signal and supplies the color difference data Pb to the D/A converter 148 and the color difference data Pr to the D/A converter 150. The D/A converters 146, 148 and 150 convert the luminance data Y, the color difference data Pb and the color difference data Pr to analog signals, respectively. Thus, the analog hi-vision signal of the reproduced image is outputted externally.

By the block coding of the present invention, the image quality is not significantly deteriorated by recording and reproducing the coded data and the high compression process is permitted.

Figure 12:
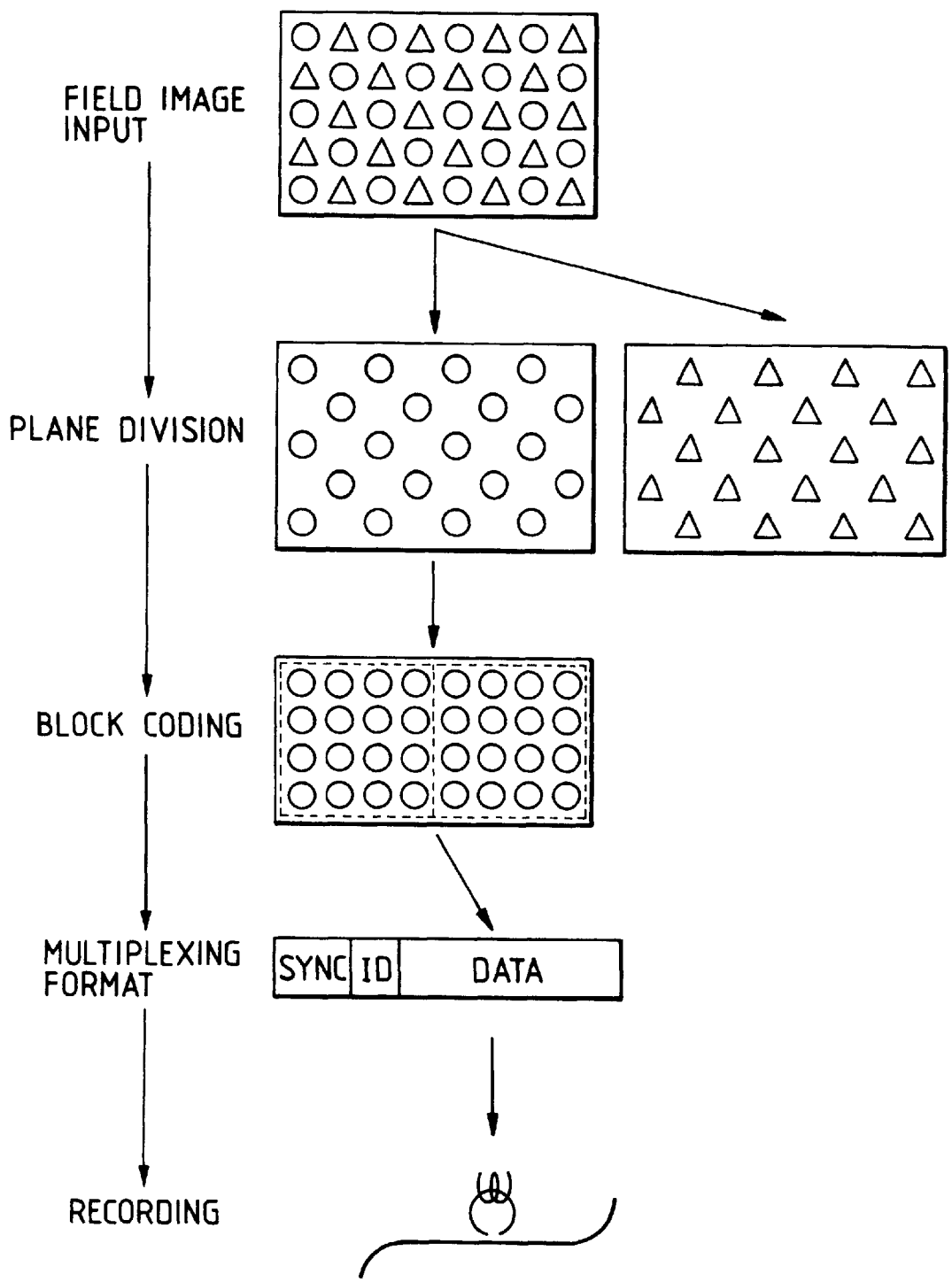
FIG. 12 shows a flow of the coding process in another embodiment.

FIG. 12 shows a flow chart of a process for recording (transmitting) only one of two planes of one field to a recording medium (transmission medium). Only the plane including the pixels marked with ○ is block-coded and it is synchronous-framed and recorded (transmitted) to the recording medium (transmission medium). This is same as a compression method which is commonly called a line offset sub-sampling, and the data quantity is reduced to one half. In reproducing, the pixels marked with △ are interpolated by the same spatial filter as that used for the interpolation of the line offset sub-sampling.

Figures 13A, 13B:
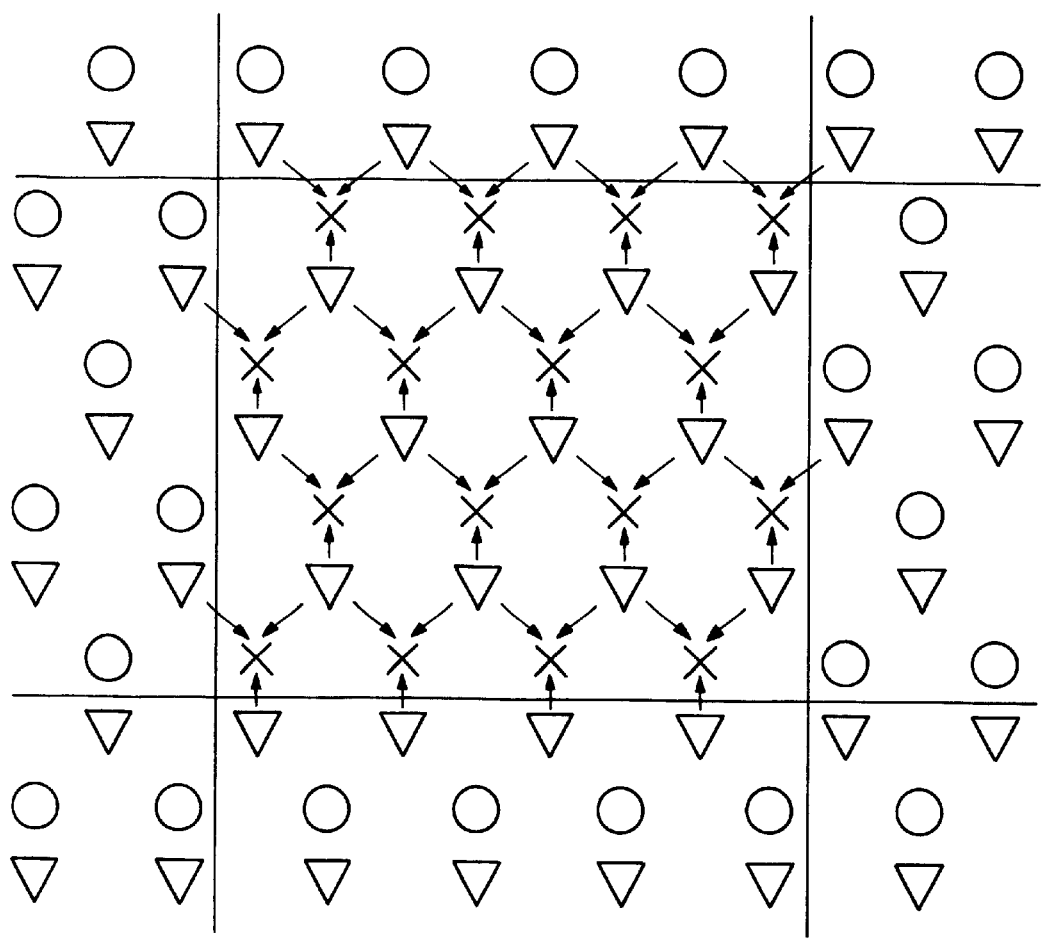
FIGS. 13A and 13B show a method for correcting (interpolating) error data in decoding data coded and recorded as shown in FIG. 12.

FIGS. 13A and 13B illustrate an image correction method when an incorrectable error occurs in the reproduction. In FIG. 13A, it is assumed that an incorrectable error occurs in the center coding block of the plane marked with ○ and the pixels marked with X in the coding block are incorrectable or have a big error. In the present embodiment, even in such a case, if the neighboring pixels in the adjacent field (for example, pixels marked with ▽) are correctly reproduced, they may be corrected (interpolated) based on the pixels of the adjacent field (for example, pixels marked with □). For example, as shown in FIG. 13B, it may be replace by a mean value of the four surrounding pixels A, B, C and D (=(A+B+C+D)/4).

While FIG. 8 and FIG. 12 have been separately explained, two modes of FIG. 8 and FIG. 12 may be selectively used.

In the prior art system, for a peripheral pixel of the coding block, it may be interpolated based on the center pixel but it is difficult to interpolate the center pixel and the deterioration of the image quality was inevitable. In the present embodiment, however, the interpolation may be made based on the adjacent pixels in the same screen whether it is on the periphery of the coding block or at the center and the deterioration of the image quality can be suppressed.

In the present embodiment, the data of the four groups of coding blocks are allocated to two transmission channels and they are time-sequenced. Accordingly, two or more coding blocks are not simultaneously rendered incorrectable by one transmission error and hence the present system is resistive to the transmission error.

The present invention may be implemented in any other forms without departing from the spirit or feature of the present invention.

For example, while the coding block of 4×4 pixels has been shown in the above embodiment, other size (for example, 8×8 pixels or 8×4 pixels) may be used. The number of coding blocks is not limited to four and the allocation of the pixels to the groups of blocks of pixels is not limited to the embodiment. The number of tracks per frame is not limited to four.

While each pixel belongs only to one coding blocks in the above embodiment, the peripheral pixels in a coding block may belong to more than one adjacent coding blocks.

While the above embodiment is applied to the magnetic recording and reproducing system, the present invention may also be applied with the same effect to a transmission system for transmitting coded image data through a plurality of transmission channels.

In other words, the foregoing description of the embodiments has been given for illustrative purposes only and not to be construed as imposing any limitation in every respect.

The scope of the present invention is, therefore, to be determined solely by the following claims and not limited by the text of the specification and alterations made within a scope equivalent to the scope of the claims fall within the true spirit and scope of the present invention.

What is claimed is:

1. An image coding apparatus comprising:
   a) input means for inputting image data representing pixels;
   b) dividing means for dividing the image data into a plurality of groups of coding block data, said plurality of groups of coding block data overlapping each other but representing no common pixels, and pixels of each of said plurality of groups of coding block data being original pixels of the image data input by said input means;
   c) extracting means for extracting at least one of the plurality of groups of coding block data so as to control a data amount of the image data, said extracting means being able to change the number of groups to be extracted; and
   d) coding means for coding the image data extracted by said extracting means.

2. An image coding apparatus according to claim 1, wherein said dividing means divides the image data such that image data representing at least a portion of adjacent pixels belong to different groups of coding block data.

3. An image coding apparatus according to claim 2, wherein said dividing means divides a field screen into two groups of blocks, and inverts a phase to allocate to the groups of blocks for each horizontal line.

4. An image coding apparatus according to claim 1, further comprising recording means for recording the coding block data coded by said coding means on a recoding medium.

5. An image coding apparatus according to claim 1 wherein said coding means codes by using the DCT conversion.

6. A coding apparatus comprising:
   input means for inputting image data representing pixels;
   first block forming means for collecting the pixels of the image data to form a plurality of large blocks of data, the plurality of large blocks of data overlapping each other but representing no common pixels, and pixels of each of the plurality of large blocks of data being original pixels of the image data input by said input means;
   second block forming means for dividing the large blocks into a plurality of small blocks of data;
   coding means for coding each small block; and
   recording means for recording the coded data of the small blocks of the same large block output from said coding means, on a same tracks of a recording medium.

7. A coding apparatus according to claim 6, wherein said first block forming means allocates data corresponding to all of the pixels on a picture such that data corresponding to adjacent pixels belong to different large blocks.

8. A coding apparatus according to claim 6 wherein said first block forming means divides a field screen into two large blocks and inverts a phase to allocate to the large block for each horizontal line.

9. A coding apparatus according to claim 6 further comprising selection means for selecting a first mode for transmitting all of the large blocks and a second mode for transmitting only a portion of the large blocks.

10. A coding apparatus comprising:
    input means for inputting image data representing pixels;
    first block forming means for collecting the pixels of image data to form a plurality of large blocks of data, the plurality of large blocks of data overlapping each other but representing no common samples, and pixels of each of the plurality of large blocks of data being original pixels of the image data input by said input means;
    extracting means for extracting at a least one of the plurality of large blocks of data, wherein said extracting means has a first mode in which said extracting means extracts data of all the large blocks, and a second mode in which said extracting means extracts only data of a part of the large blocks;
    second block forming means for dividing the large blocks extracted by said extracting means into a plurality of small blocks of data; and
    coding means for electively coding each of the small blocks, wherein said coding means has a first mode in which said coding means codes data of all the large blocks, and a second mode in which said coding means codes only data of a part of the large blocks.

11. A coding apparatus according to claim 10 wherein said first block forming means allocates all of the pixels on a screen to the large blocks such that at least a portion of adjacent pixels belong to different large blocks.

12. A coding apparatus according to claim 10 wherein said coding means codes by using the DCT conversion.

13. An apparatus according to claim 10, further comprising decoding means for decoding data coded by said coding means.

14. An image coding method comprising:
a) an input step of inputting image data representing pixels;
b) a dividing step of dividing the image data into a plurality of groups of coding block data, said plurality of groups of coding block data overlapping each other but representing no common pixels, and pixels of each of said plurality of groups of coding block data being original pixels of the image data input in said input step;
c) an extracting step of extracting at least one of the plurality of groups of coding block data so as to control a data amount of the image data, said extracting step being able to change the number of groups to be extracted; and
d) a coding step of coding the image data extracted in said extracting step.

15. A coding method comprising:
an input step of inputting image data representing pixels;
a first block forming step of collecting samples of the image data to form a plurality of large blocks of data, the plurality of large blocks of data overlapping each other but representing no common pixels, and pixels of each of the plurality of large blocks of data being original pixels of the image data input in said input step;
a second blocks forming step of dividing the large blocks into a plurality of small blocks of data; and
a coding step of coding each small block, and
a recording step of recording the coded data of the small blocks of the same large block output in said coding step, on a same tracks of a recording medium.

16. A coding method comprising:
an input step of inputting image data representing pixels;
a first block forming step of collecting the pixels of image data to form a plurality of large blocks of data, the plurality of large blocks of data overlapping each other but representing no common samples, and pixels of each of the plurality of large blocks of data being original pixels of the image data input in said input step;
an extracting step of extracting at least one of the plurality of large blocks of data, wherein said extracting step has a first mode in which said extracting step extracts data of all the large blocks, and a second mode in which said extracting step extracts only data of a part of the large blocks;
a second block forming step of dividing the large blocks extracted by said extracting step into a plurality of small blocks of data; and
a coding step of electively coding each of the small blocks, wherein said coding step has a first mode in which said coding step codes data of all the large blocks, and a second mode in which said coding step codes only data of a part of the large blocks.

17. An image coding apparatus comprising:
input means for inputting color image data representing pixels;
first block forming means for collecting the pixels of the color image data to form a plurality of large blocks of data, the plurality of large blocks of data overlapping each other but representing no common pixels, and pixels of each of the plurality of large blocks of data being original pixels of the color image data input by said input means;
second block forming means for dividing the large blocks into a plurality of small blocks of data;
coding means for coding each small block; and
recording means for recording the coded data of the small blocks of the same large block output from said coding means, on a same tracks of a recording medium, on which the coded data of the small blocks of other large blocks is not recorded.

18. An apparatus according to claim 17, further comprising error correction coding means for error-correction coding the coded data.

19. An apparatus according to claim 17, wherein the color image data is formed by luminance component data and color difference component data, and wherein said coding means performs a coding processing on an each opponent data basis.

20. An apparatus according to claim 17, wherein said coding means codes the color image data by using an orthogonal transform.

21. An image coding apparatus comprising:
input means for inputting color image data representing pixels;
first block forming means for collecting the pixels of the color image data to form a plurality of large blocks of data, the plurality of large blocks of data overlapping each other but representing no common pixels, and pixels of each of the plurality of large blocks of data being original pixels of the color image data input by said input means;
second block forming means for dividing the large blocks into a plurality of small blocks of data;
coding means for coding each small block; and
recording means for recording the coded data of the small blocks of the same large block output from said coding means, on a same tracks of a recording medium,
wherein the color image data is formed by luminance component data and color difference component data, and
wherein said coding means performs a coding processing on an each component data basis.

22. An apparatus according to claim 21, further comprising error correction coding means for error-correction coding the coded data.

23. An apparatus according to claim 21, wherein said coding means codes the color image data by using an orthogonal transform.

24. An image coding method comprising:
an input step of inputting color image data representing pixels;
a first block forming step of collecting the pixels of the color image data to form a plurality of large blocks of data, the plurality of large blocks of data overlapping each other but representing no common pixels, and pixels of each of the plurality of large blocks of data being original pixels of the color image data input in said input step;
a second block forming step of dividing the large blocks into a plurality of small blocks of data;
a coding step of coding each small block; and
a recording step of recording the coded data of the small blocks of the same large block output in said coding step, on same tracks of a recording medium, on which the coded data of the small blocks of other large blocks is not recorded.

25. An image coding method comprising:

an input step of inputting color image data representing pixels;

a first block forming step of collecting the pixels of the color image data to form a plurality of large blocks of data, the plurality of large blocks of data overlapping each other but representing no common pixels, and pixels of each of the plurality of large blocks of data being original pixels of the color image data input in said input step;

a second block forming step of dividing the large blocks into a plurality of small blocks of data;

a coding step of coding each small block; and a recording step of recording the coded data of the small blocks of the same large block output in said coding step, on same tracks of a recording medium, wherein the color image data is formed by luminance component data and color difference component data, and wherein said coding step performs a coding processing on an each component data basis.

* * * * *

UNITED STATES PATENT AND TRADEMARK OFFICE
CERTIFICATE OF CORRECTION

PATENT NO. : 6,219,157 B1
DATED : April 17, 2001
INVENTOR(S) : Akihiro Shikakura et al.

It is certified that error appears in the above-identified patent and that said Letters Patent is hereby corrected as shown below:

Title page,
Item [63] Related U.S. Application Data
"Continuation-in-part" should read -- Continuation --.

Column 1,
Line 29, "affect" should read -- effect --.

Column 2
Line 20, "to" should be deleted; and
Line 44, "overlapped to" should read -- overlapping --.

Column 3,
Line 51, "every" should read -- and every --; and
Line 55, "other pixels." should read -- other pixel. --.

Column 4,
Line 15, "supplied" should read -- supplies --;
Line 41, "126a(2)" should read -- 126b(1) --; and
Line 43, "126b(1)" should read -- 126a(2) --;

Column 5,
Line 32, "it"should read -- variable-length coded output --; and
Line 40, "euqlization" should read -- equalization --.

Column 6,
Line 3, "$\Delta \nabla$" should read -- $\Delta, \nabla,$ --;
Line 29, "the" should read -- with the --;
Line 46, "is" should read -- is the --;
Line 62, " □)." should read -- $\nabla$). --; and
Line 63, "replace" should read -- replaced --.

Column 7,
Line 19, "size" should read -- sizes --;
Line 25, "blocks" should read -- block --;
Line 27, "blocks." should read -- block. --;
Line 34, "and" should read -- and is --; and
Line 35, "every" should read -- any --.

UNITED STATES PATENT AND TRADEMARK OFFICE
CERTIFICATE OF CORRECTION

PATENT NO.    : 6,219,157 B1
DATED         : April 17, 2001
INVENTOR(S)   : Akihiro Shikakura et al.

It is certified that error appears in the above-identified patent and that said Letters Patent is hereby corrected as shown below:

Column 8,
Line 5, "1" should read -- 1, --;
Line 22, "a same" should read -- same --;
Line 27, "6" should read -- 6, --;
Line 44, "a" should be deleted;
Line 54, "electively" should read -- selectively --.
Lines 59 and 63, "10" should read -- 10, --; and Column 9,
Line 28, "blocks" (first occurrence) should read -- block --;
Line 29, "and" should be delete; and
Line 30, "block" should read -- block; --.
Line 52, "electively" should read -- selectively --.

Column 10,
Line 6, "a same" should read -- same --;
Line 15, "opponent" should read -- component --;
Line 36, "a same" should read -- same --; and
Line 41, "on an each" should read -- on each --.

Column 12,
Line 10, "an each" should read -- each --.

Signed and Sealed this

Twenty-eighth Day of May, 2002

Attest:

JAMES E. ROGAN
*Attesting Officer*            *Director of the United States Patent and Trademark Office*